United States Patent [19]

Takeuchi et al.

[11] B 4,000,928

[45] Jan. 4, 1977

[54] VEHICLE SKID CONTROL SYSTEM INCLUDING VEHICLE SPEED SENSOR

[75] Inventors: Yasuhisa Takeuchi, Yokosuka; Haruhiko Iizuka, Yokohama, both of Japan

[73] Assignee: Nissan Motor Company Limited, Yokohama, Japan

[22] Filed: May 8, 1975

[21] Appl. No.: 575,583

[44] Published under the second Trial Voluntary Protest Program on March 16, 1976 as document No. B 575,583.

Related U.S. Application Data

[63] Continuation of Ser. No. 365,465, May 31, 1973, abandoned.

[52] U.S. Cl. ............................... 303/103; 73/128; 73/493; 280/43.23; 280/764; 303/20
[51] Int. Cl.² ......................................... B60T 8/08
[58] Field of Search ............ 73/128, 146, 493, 527; 180/1 AW, 105; 188/181; 280/43.23, 150 A; 303/20, 21; 317/5; 324/161; 340/53, 62, 263

[56] References Cited

UNITED STATES PATENTS

| | | | |
|---|---|---|---|
| 2,279,409 | 4/1942 | Milster et al. | 73/128 |
| 3,754,797 | 8/1973 | Rodi et al. | 303/21 BE |
| 3,758,166 | 9/1973 | Kuwana et al. | 303/21 P |

*Primary Examiner*—Trygve M. Blix
*Assistant Examiner*—Stephen G. Kunin

[57] ABSTRACT

A device for effectively controlling the braking system of a wheeled vehicle to eliminate a possibility of skidding comprising an electric computing module which is responsive to electric signals fed thereto from a vehicle speed sensor mounted on an extra wheel which mechanically contacts the road surface, and a vehicle supporting wheel rotational speed sensor.

8 Claims, 11 Drawing Figures

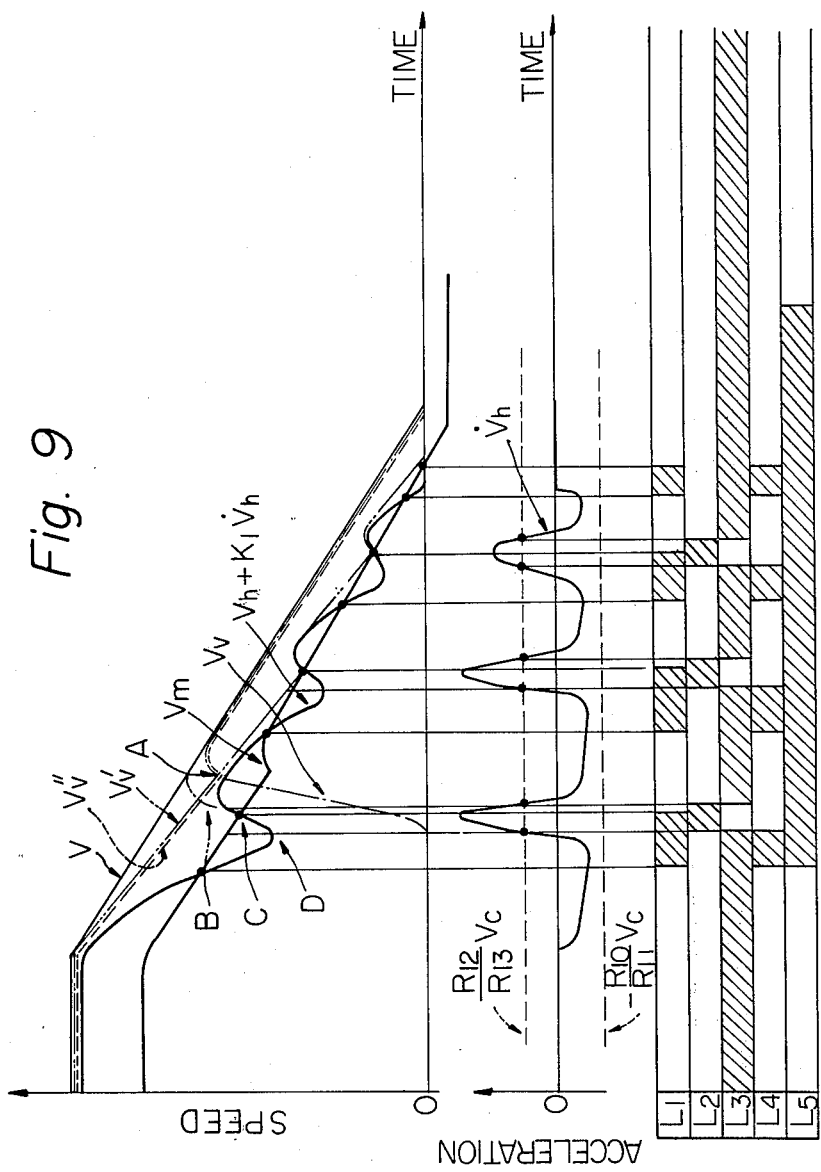

VEHICLE SKID CONTROL SYSTEM INCLUDING VEHICLE SPEED SENSOR

This is a continuation of application Ser. No. 365,465, filed May 31, 1973, now abandoned.

This invention relates to a skid control system for a wheeled vehicle including an improved vehicle speed sensor.

Heretofore, various anti-skid systems have been proposed and demonstrated. Typical of such a system is one which is arranged to control the pressure of operating fluid supplied to hydraulic brake cylinders so that the slipping rate of the vehicle supporting wheels, defined as (vehicle speed - wheel speed)/vehicle speed, is maintained in the neighborhood of 20 per cent, thereby providing maximum effective braking without allowing the vehicle to skid sideways. In systems of this type, it is necessary to detect vehicle speed as well as wheel speed. The wheel speed is usually detected by a known magneto-generator type speed sensor, whereas, conventionally, it has been a common practice to calculate a pseudo-vehicle speed on the basis of the acceleration of a wheel or its variation. However, there arises a problem in that variation of the braking force mechanically applied to the braking system by the vehicle driver or the frictional characteristics of the road surface will tend to prevent satisfactory operation of the skid control system. Another disadvantage of prior art systems is the complicatedness of the mechanism for calculating and utilizing the pseudo-vehicle speed signal.

To solve the above-mentioned problems, it is proposed to provide a vehicle speed sensor operatively mounted on an extra wheel carried by the vehicle and contacting the road surface, for directly sensing the vehicle speed, the wheel being subject to no braking force acting thereon during braking. However, provision of such an extra wheel raises a problem of impairing the appearance of the vehicle.

In accordance with the concept of the present invention, there is provided a skid control system for a wheeled vehicle having a fluid actuated brake system with a master cylinder mechanically operable by the vehicle driver by means of a brake pedal which is connected through fluid lines with brake cylinders for actuating the same, the skid control system comprising valve means located in the fluid lines for varying the fluid pressure supplied to the brake cylinders, means for sensing the rotational speed of at least one wheel which supports the vehicle, means for sensing vehicle speed, the vehicle speed sensing means being actuated in response to a sensed impending skid condition an electric control module for detecting an impending skid condition from a change in the sensed wheel speed and for controlling the operation of the valve means in response to the sensed vehicle speed as well as wheel speed in a manner to prevent skidding of the vehicle, the control module initiating its skid preventive operation upon detection of a sensed impending skid condition, but controlling the valve means in response only to the sensed wheel speed until the vehicle speed sensing means is actuated.

Therefore, it is an object of the present invention to provide an improved skid control system including a vehicle speed sensor which is actuated in response to a sensed impending skid condition.

Another object of the present invention is to provide a skid control system of the aforementioned type in which the vehicle speed sensor is mounted on an extra wheel which is normally concealed but is brought into engagement with the road surface when actuated.

It is a further object of the present invention to provide a skid control system which is capable of optimal control of the fluid pressure supplied to brake cylinders through utilization of sensed vehicle speed as well as wheel speed.

These and other objects will be apparent from the following description of the invention when taken in conjunction with the accompanying drawings, in which.

Figure 1:
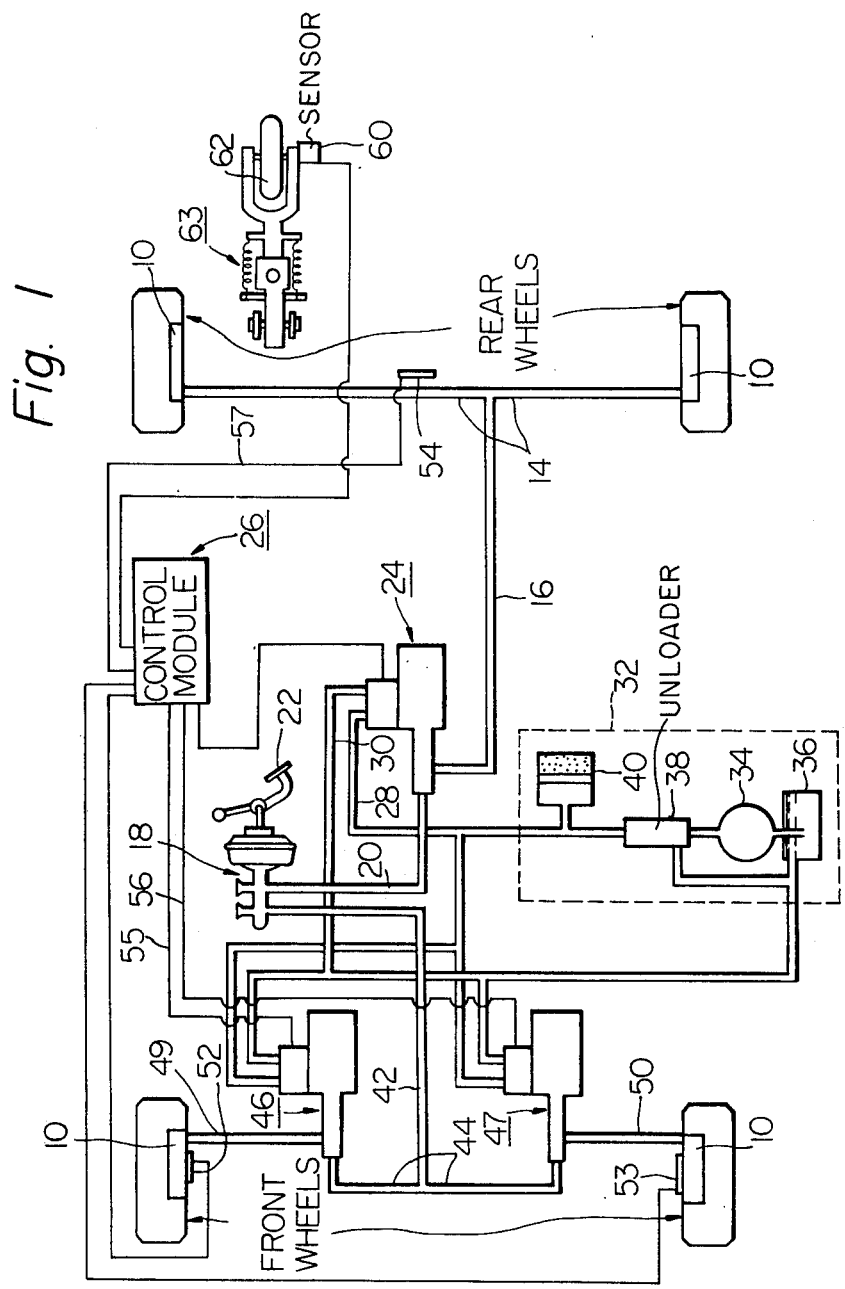
FIG. 1 is a schematic diagram of an embodiment of a skid control system according to the present invention.
Figure 8A:
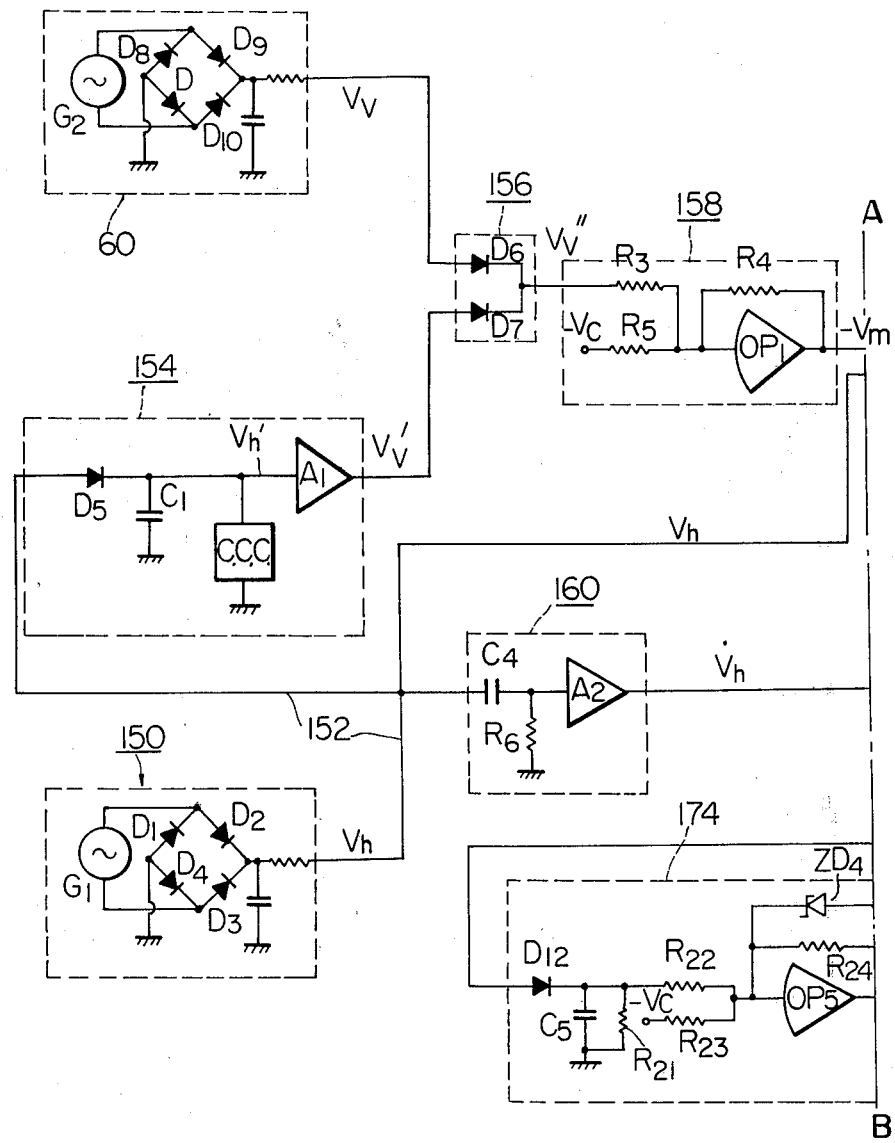
Figure 8B:
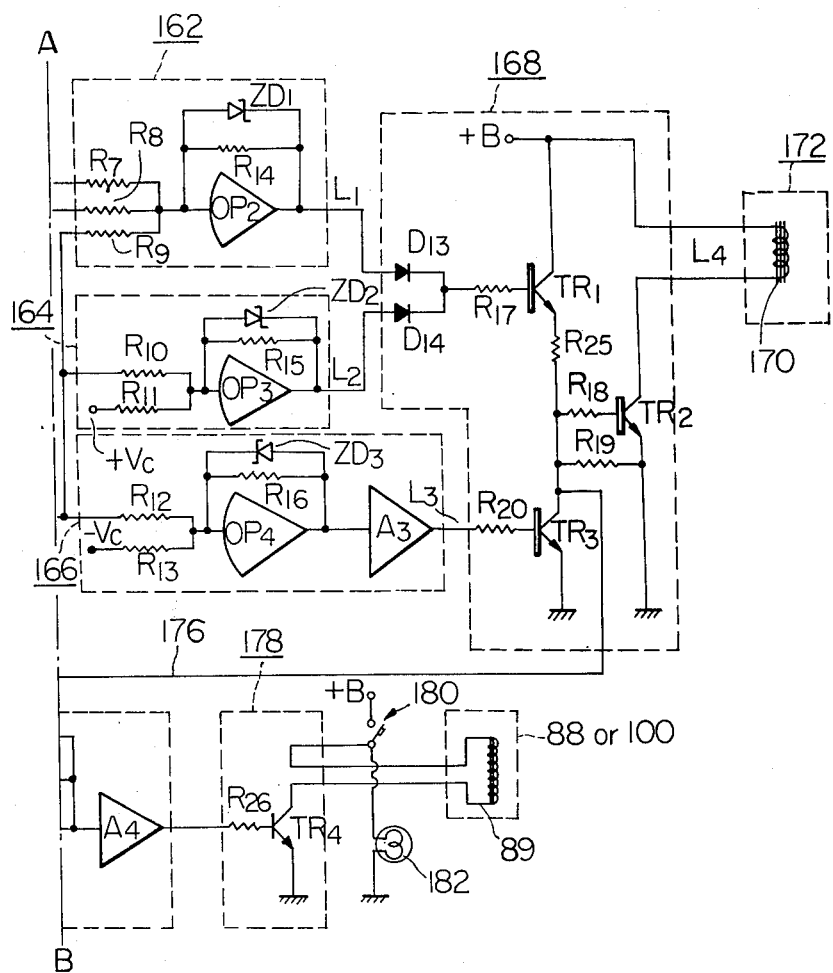
Figure 10:
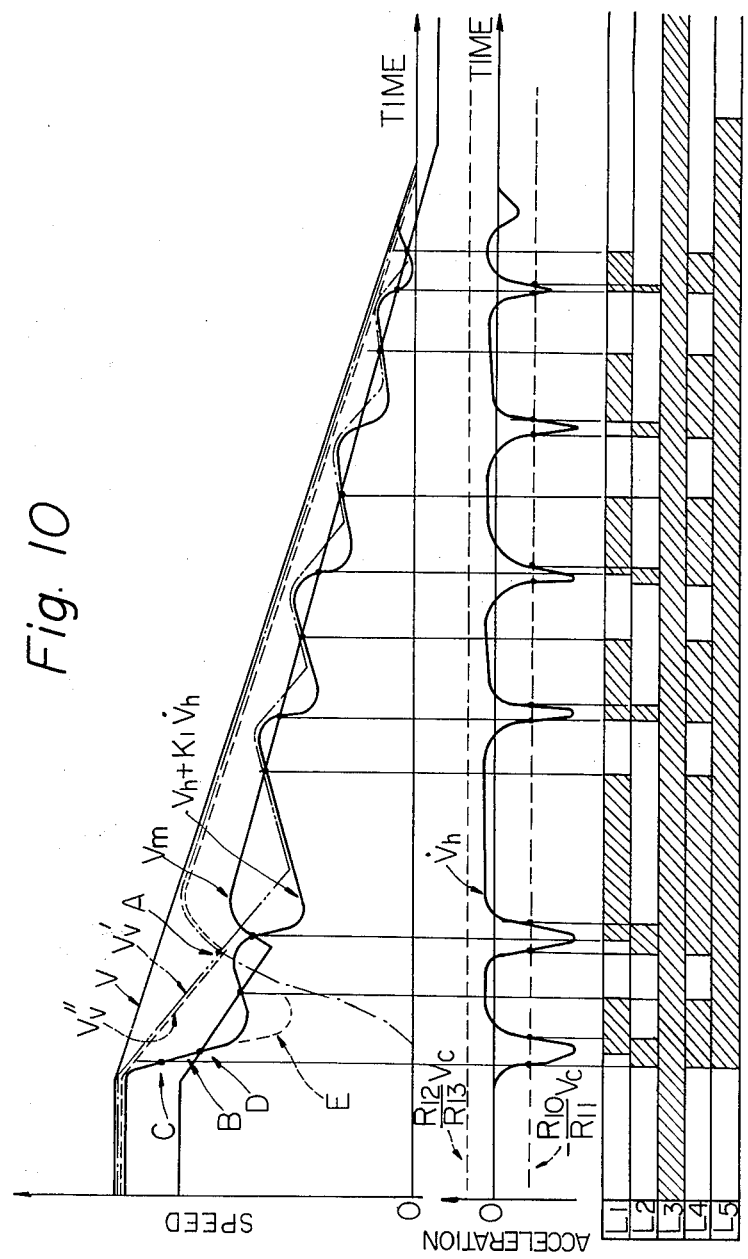

FIG. 8, split along the line AB and identified on the two sheets of drawings as FIG. 8a and FIG. 8b is a circuit diagram of the electric control module shown in FIG. 1; and FIGS. 9 and 10 are diagrams useful in explaining the operation of an embodiment of a skid control system of the present invention.

Referring now to FIG. 1, there is shown a preferred embodiment of a skid control system according to the present invention, which controls front and rear wheels of a motor vehicle which are equipped with wheel brake cylinders 10 and brake drums (not shown). In the figure, double solid parallel lines and single lines represent hydraulic lines and electric lines, respectively. Hydraulic lines 14 are connected to the rear wheel brake cylinders 10 and to a common fluid line 16 which is pressurized by a master cylinder assembly 18 via a line 20. The master cylinder assembly 18 can be of a conventional construction and actuated through a foot pedal 22 by the vehicle driver. The fluid pressure from the master cylinder 18 can be varied by means of an actuator valve 24 which is connected between the fluid lines 16 and 20. Thus, the actuator valve 24 can control the fluid pressure supplied to the rear wheel brake cylinders 10 so as to control the operation of the rear brakes.

The actuator valve 24 is of a conventional "debooster" type and, in response to an electric signal from an electric control module 26, acts to reduce the pressure of fluid being fed into the brake cylinders 10 from the master cylinder 18. The actuator valve 24 includes an inlet and outlet (no numerals) for working fluid, which are connected through lines 28 and 30 to a working fluid source 32 including a fluid pump 34, a reservoir 36, an unloader 38 and an accumulator 40 respectively.

Fluid pressure from the master cylinder 18 is also conducted through a common line 42 to hydraulic lines 44 which are connected to actuator valves 46 and 47 of similar construction to the actuator valve 24. The actuator valves 46 and 47 are provided one for each front wheel (no numerals) and are connected to their respective brake cylinders 10 through fluid lines 49 and 50 respectively. The actuator valves 24, 46, and 47 are also connected to the electric control module 26 so as to be responsive to electric control signals fed therefrom. While, in this embodiment, four wheels are controllably braked by the present skid control system, it will be understood that the system may be designed to control the braking of one or two or three or more than four wheels.

The control module 26 receives information from sensors 52 and 53 operatively connected respectively to each of the front wheels and also from a sensor 54 operatively connected to rear wheels (no numerals). The sensors 52, 53 and 54 are of a conventional magneto-generator type and provide varying electric signals via lines 55, 56 and 57, respectively to the module 26 which indicate the rotational velocities of the associated wheels.

The control module 26 also receives information from a sensor 60 of similar construction to the sensors 52, 53, and 54 which is operatively connected to an extra wheel 62 which is provided for sensing true vehicle speed. Although not specifically shown, a support structure 63 for rotatably supporting the extra wheel 62 is pivotally mounted to the underside of a vehicle body 70 (see FIG. 2) and, when actuated, is moved to a position to hold the extra wheel 62 in contact with road surface 78 (see FIG. 2) so that the sensor 60 produces a signal indicative of vehicle speed.

The control module 26 is designed to detect an impending skid condition from the electric signals supplied thereto from the wheel speed sensors 52, 53 and 54 and to actuate the extra wheel supporting structure 63 in response to an impending skid condition. Although the module 26 initiates its skid preventive operation upon detection of an impending skid condition, actuation of the extra wheel supporting structure 63 results in accurate vehicle speed information being supplied to the module 26 from the sensor 60 so that variation of the fluid pressure supplied to the brake cylinders 10 will be performed in a more precise manner by the actuator valves 24, 46, and 47.

Figure 2:
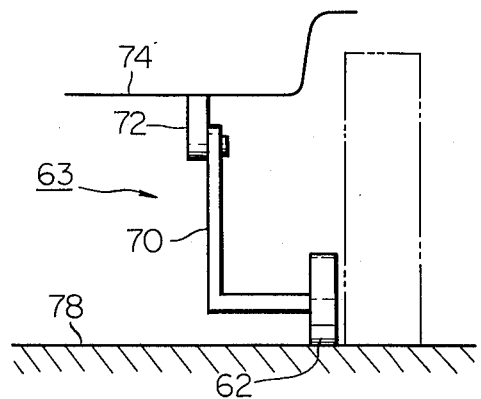
FIGS. 2 and 3 are rear and side views, respectively, showing one embodiment of a support structure for rotatably supporting an extra wheel carrying a vehicle speed sensor.
Figure 3:
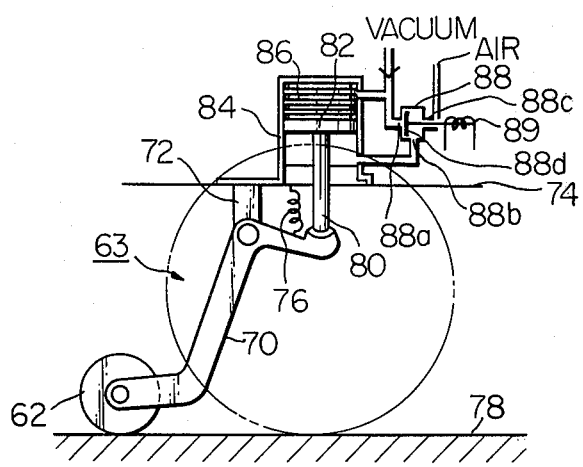

In FIGS. 2 and 3, there is shown one example of the support structure 63 which includes a generally L-shaped arm 70 carrying the extra wheel 62 at its lowre end and which is pivotally mounted by a mounting 72 to the underside of the vehicle body 74. A extension spring 76 is provided for biasing the arm 70 in a counter-clockwise direction as viewed in FIG. 3 so as to maintain the extra wheel 62 in contact with the road surface 78 at a certain contact pressure. The extra wheel 62 can be constructed of any suitable material and, in this embodiment, includes a tire (no numeral) impregnated with urethane rubber. Although not shown, the extra wheel 62 is equipped with the sensor 60 for sensing vehicle speed.

The L-shaped arm 70 is shaped at its upper end to provide a seat for a lower end of a piston rod 80 which is secured to a piston 82 slidably mounted in a cylinder 84. As seen, the cylinder 84 is fixedly mounted on the vehicle body 74 and includes a spring 86 therein for biasing the piston 82 in a downward direction against the action of the spring 76. The piston 82 divides the interior of the cylinder 84 into two chambers, an upper chamber (no numeral) communicating with a vacuum source (not shown) and also with a port 88a of a solenoid valve 88 operated by a solenoid 89. On the other hand, a lower chamber (no numeral) of the cylinder 84 communicates with another port 88b of the valve 88, the port 88b in an operative position as shown being in communication with a third port 88c which leads to an air source (not shown). When the solenoid 89 is energized, the valve member 88d is moved in a lefthand direction to the position shown, bringing the port 88b into communication with the port 88c and simultaneously blocking communication between the port 88a and the port 88b. This will introduce air pressure into the lower chamber of the cylinder 84, so that the piston 82 is moved in an upward direction to the position shown against the action of the spring 86. As a result, the arm 70 is rotated in a counter-clockwise direction by the spring 76, bringing the extra wheel 62 into engagement with the road surface. During normal operation, the valve member 88d of the solenoid valve 88 is kept in a rightward position to provide communication between the port 88a and the port 88b but to block communication between the port 88b and the port 88c. Thus, not only the upper chamber but also the lower chamber of the cylinder 84 is under vacuum so that the piston 82 is held in its lower position by the spring 86. Accordingly, in normal operation, the extra wheel 62 is raised away from the road surface 78.

Figure 4:
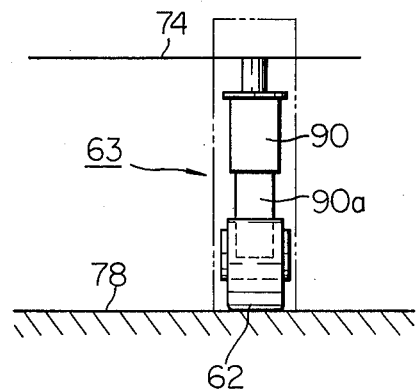
FIGS. 4 and 5 are similar to FIGS. 2 and 3 but show another embodiment of an extra wheel supporting structure.
Figure 5:
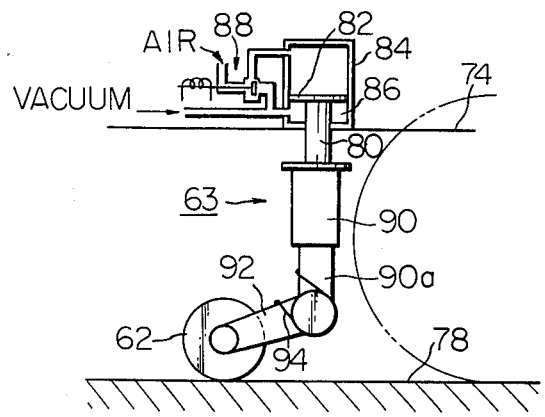

In FIGS. 4 and 5, there is shown another example of an extra wheel support structure 63 which includes a shock absorber 90 in place of the L-shaped arm 70 of the FIGS. 2 and 3 embodiment. The shock absorber 90 has a lower telescoping stem 90a which is pivotally connected to a lever 92 carrying the extra wheel 62 at its end. A spring 94 is provided for urging the lever 92 in a counter-clockwise direction as shown to bias the extra wheel 62 against the road surface 78. This embodiment is otherwise similar to that of FIGS. 2 and 3 except that the connection of the solenoid valve 88 and the vacuum source with the upper and lower chambers of the cylinder 84 is reversed from that of the embodiment shown in FIGS. 2 and 3.

Figure 6:
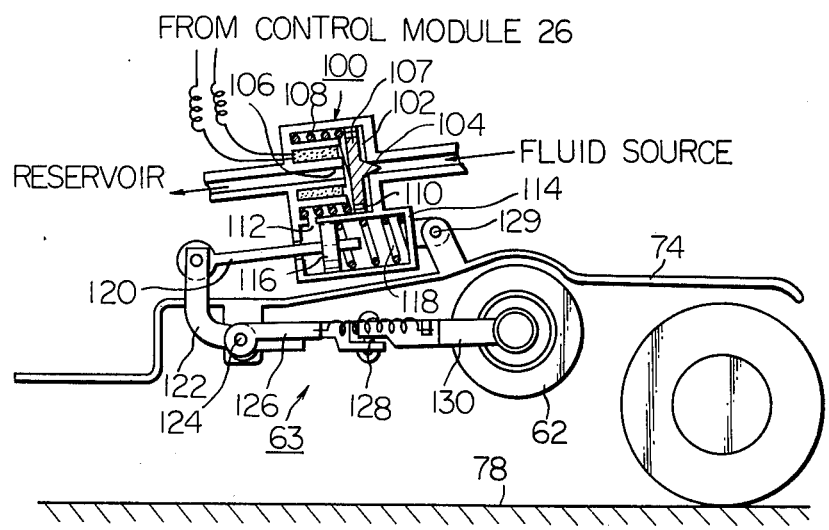
FIGS. 6 and 7 are side and bottom plan views, respectively, showing a third embodiment of an extra wheel supporting structure.
Figure 7:
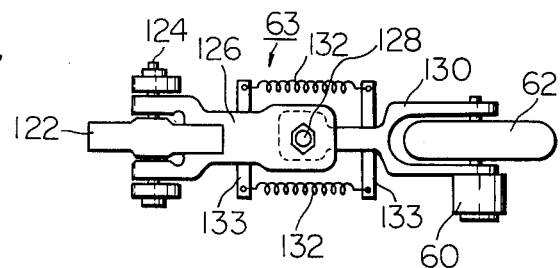

In FIGS. 6 and 7, there is shown a further example of an extra wheel support structure 63 which hydraulically moves the extra wheel 62 to its operative position. A solenoid valve 100 is provided which includes a chamber 102 having an inlet port 104 leading from a working fluid source (not shown) and a drain port 106 leading to a reservoir (not shown). The solenoid valve 100 also includes an armature 107 acting as a valve member which is normally urged in a righthand direction as viewed in FIG. 6 by the action of a spring 108, thereby closing the inlet port 104. When the solenoid valve 100 is actuated by an electric signal from the control module 26, the armature 107 is moved in a lefthand direction against the action of the spring 108, opening the inlet port 104 and also blocking the drain port 106. As a result, fluid under pressure is permitted to flow through the chamber 102, an opening 110 in the armature 107 and an opening 112 in the valve housing (no numeral) into a cylinder 114 provided integrally with the solenoid valve 100. This will move a piston 116 in a righthand direction within the cylinder 114 against the action of a spring 118 provided therein. The solenoid valve 100 and cylinder 114 are pivotally mounted to the vehicle body by means of a pivot shaft 129.

The piston 116 has a piston rod 120 secured thereto which is pivotally connected to a generally L-shaped arm 122 rotatably supported by a shaft 124. As best seen in FIG. 7, an intermediate member 126 is also pivotally supported by the shaft 124 and has secured thereto a generally vertically extending shaft 128 on which is horizontally rotatably mounted a bifurcated trailing member 130 for rotatably supporting the extra wheel 62.

When the piston 116 is moved in a righthand direction as a result of the actuation of the solenoid valve 100, the L-shaped arm 122 is rotated in a clockwise direction, permitting the intermediate member 126 and accordingly the extra wheel 62 to rotate in the same direction until the extra wheel 62 comes into contact with the road surface 78. With this arrangement, the L-shaped arm 122 is not effected by upward and downward movement of the extra wheel 62 which results from irregularities on the road surface 78. Further, it will be appreciated that it is possible to reduce the time during which the extra wheel 62 is not in contact with the road surface 78 by providing rolling friction or a spring arrangement between the intermediate member 126 and the shaft 124. While the intermediate member 126 and the trailing member 130 are connected by means of two springs 132 and arms 133, it should be noted that these springs 132 and arms 133 are provided for the purpose of keeping the extra wheel 62 in the position shown in FIG. 6 when sensing of vehicle speed is not necessary.

FIGS. 8a – 8b there is shown a typical arrangement of the control module 26 shown in FIG. 1. As described above, the control module 26 detects an impending skid condition from the electric signals supplied thereto from the wheel speed sensors 52, 53, and 54 and provides a first output signal to be supplied to the actuator valves 24, 46, and 47 for reducing the fluid pressure to the respective brake cylinders, and a second output signal to be transmitted to the support structure for causing the extra wheel 62 to be engaged with the road surface 78.

Although not shown, the control module 26 comprises a power supply which supplied B+, +$V_c$, and −$V_c$ voltages with reference the ground potential of the control module 26.

Designated as 150 is a wheel speed sensor which corresponds to the wheel speed sensors 52, 53 and 54 and comprises a magneto-generator $G_1$ and four diodes $D_1$, $D_2$, $D_3$ and $D_4$ connected in bridge fashion. Although the control module 26 may comprise a separate channel to control each wheel brake only one channel is shown herein for simplicity of description. The sensor 150 provides a DC voltage $V_h$ of a magnitude proportional to the wheel speed. The output $V_h$ of the wheel speed sensor 150 is connected through a line 152 to a pseudo-vehicle speed signal circuit 154 which comprises a diode $D_5$, a grounded capacitor $C_1$, a constant-current discharge circuit C.C.C. and an amplifier $A_1$. The capacitor $C_1$ is charged according to the magnitude of the DC voltage $V_h$ supplied from the wheel speed sensor 150, but the discharging of the capacitor $C_1$ is governed by the constant-current discharge circuit C.C.C. If the wheel speed rapidly drops to zero as a result of the wheel being locked, the charge on the capacitor $C_1$ discharges gradually because of the constant-current discharge circuit. Thus, by properly determining the rate of discharge of the discharge circuit C.C.C., it is possible to have the maximum rate of change of the output of the circuit C.C.C. $V_h'$ correspond to the maximum deceleration rate of the associated wheel (which lies between 0.85 and 0.9G; G = 9.8 m/S$^2$). The power amplifier $A_1$ amplifies the voltage $V_h'$ to provide a voltage $V_v'$ which serves as a pseudo-vehicle speed signal until the extra wheel sensor 60 comes into operation.

The output $V_v'$ of the pseudo-vehicle speed signal circuit 154 is fed into one input of a comparator 156 comprising two diodes $D_6$ and $D_7$. The other input to the comparator 156 is connected to the output of the extra wheel speed sensor 60 so as to be supplied with a voltage $V_v$ indicative of vehicle speed. The extra wheel speed sensor 60 is of similar construction to the wheel speed sensor 150 and the function of the comparator 156 is to provide an output voltage $V_v''$ which is equal to the greater of the two voltage inputs $V_v$ and $V_v'$.

The output of the comparator 156 is connected to a module speed signal circuit 158 which comprises resistors $R_3$, $R_4$ and $R_5$ and an operational amplifier $OP_1$. The circuit 153 is supplied with a negative constant voltage −$V_c$ at one end of the resistor $R_5$. In response to the input voltage $V_v''$, the module speed signal circuit 158 provides an output voltage −$V_m$ such that;

$$-V_m = -\left(\frac{R_4}{R_3}V_v'' - \frac{R_4}{R_5}V_c\right) \quad (1)$$

The output of the wheel speed sensor 150 is fed also into a differentiating circuit 160 which comprises a capacitor $C_4$, a grounded resistor $R_6$ and an amplifier $A_2$, and provides an output signal $V_h'$ ($d^v h/dt$).

A speed comparator 162 is provided having three inputs which are connected to the outputs of the module speed signal circuit 158, the wheel speed sensor 150 and the differentiating circuit 160 respectively, to receive the signals +$V_m$, $V_h$ and $V_h'$, respectively. the speed comparator 162 comprises resistors $R_7$, $R_8$, $R_9$, $R_{14}$, a Zener diode $ZD_1$ and an operational amplifier $OP_2$, and provides an output voltage $L_1$ such that;

$$L_1 = \frac{R_{14}}{R_7}V_m - \frac{R_{14}}{R_8}V_h - \frac{R_{14}}{R_9}V_h'$$
$$= \frac{R_{14}}{R_7}\left\{V_m - \frac{R_7}{R_8}\left(V_h + \frac{R_8}{R_9}V_h'\right)\right\} \quad (2)$$

As is appreciated by those skilled in the art, the output $L_1$ of the speed comparator 162 is limited by the Zener diode $ZD_1$ in the following manner:

Assuming that the Zener voltage is $V_{ZD_1}$, $$0 < L_1 < V_{ZD_1} \quad (3)$$

Substituting Eq. (1) into (2) results in:

$$L_1 = \frac{R_{14}}{R_8}\left\{\frac{R_4R_8}{R_3R_7}\left(V_v'' - \frac{R_3}{R_5}V_c\right) - \left(V_h + \frac{R_8}{R_9}V_h'\right)\right\} \quad (4)$$

If, in Eq. (4), $R_{14}/R_8$ is made sufficiently large, for example, more than 100, it can be said from Eq. (3) that:

When $\frac{R_4R_8}{R_3R_7}\left(V_v'' - \frac{R_3}{R_5}V_c\right) < V_h + \frac{R_8}{R_9}V_h' \quad (5)$
$L_1 = 0$ ;

and when $\frac{R_4R_8}{R_3R_7}\left(V_v'' - \frac{R_3}{R_5}V_c\right) > V_h + \frac{R_8}{R_9}V_h' \quad (6)$
$L_1 = V_{ZD_1}$ The condition as represented by Eq. (6) will be hereinafter referred to as an "excessive slipping condition".

During this condition, the output $L_1$ of the speed comparator 162 is high as compared to zero, providing a signal indicative of the excessive slipping condition which can be represented by $L_1 = 1$ in a Boolean algebra expression.

The output of the differentiating circuit 160 is fed also into a deceleration comparator 164 and an acceleration comparator 166 which are of similar construction to the speed comparator 162. The deceleration comparator 164 provides an output $L_2$ which increases sharply when the deceleration rate of the associated wheel exceeds a certain predetermined value. More particularly,
when $$-V_h' > R_{10}/R_{11}V_c, L_2 = 1 \quad (7);$$

and when $$-V_h' < R_{10}/R_{11}V_c, L_2 = 0 \quad (8)$$

The output $L_2$ (= 1) will be hereinafter referred to as an excessive deceleration condition.

The acceleration comparator 166 includes an amplifier $A_3$ acting as an inverter. Thus, the output $L_3$ of the comparator 166 is as follows:
When $$V_h' > R_{12}/R_{13}V_c, L_3 = 1 \quad (9);$$

and when $$V_h' < R_{12}/R_{13}V_c, L_3 = 0 \quad (10)$$

The output $L_3$ (= 1) will be hereinafter referred to as an excessive acceleration condition.

The outputs $L_1$, $L_2$ and $L_3$ of the comparators 162, 164 and 166 respectively are fed into a solenoid driver 168 which actuates a solenoid coil 170 of an actuator valve 172 corresponding to those indicated as 24, 46 and 47 in FIG. 1. As shown, the driver 168 comprises transistors $TR_1$, $TR_2$ and $TR_3$, diodes $D_{13}$ and $D_{14}$ and resistors $R_{17}$ to $R_{20}$ and $R_{25}$. Since the base of the transistor $TR_1$ is connected through the resistor $R_{17}$ to the diodes $D_{13}$ and $D_{14}$ to receive the outputs $L_1$ and $L_2$ respectively, the transistor $TR_1$ is rendered conductive when either $L_1$ or $L_2$ is at a high level. Also, the transistor $TR_3$ is rendered conductive in response to a high level of $L_3$. When the transistor $TR_3$ is conducting, the collector potential thereof is held at substantially zero voltage, so that even if the transistor $TR_1$ is conducting, the transistor $TR_2$ is non-conducting. However, when $L_3 = 0$, i.e., the transistor $TR_3$ is rendered non-conducting, conduction of $TR_1$ raises the collector potential of $TR_3$, thus driving $TR_2$ into conduction. Assuming that the expression ($L_4 = 1$) represents a condition in which the solenoid coil 170 is energized, operation of the solenoid driver 168 may be expressed in terms of Boolean algebra, as follows:

$$L_4 = (L_1 + L_2) \times \overline{L_3} \quad (11)$$

This equation means that if either or both of the excessive slipping condition and the excessive deceleration condition occurs but the excessive acceleration condition does not occur, the actuator valve 172 is actuated. This relationship is shown in Table below.

| $L_1$ | $L_2$ | $L_3$ | $L_4$ |
|---|---|---|---|
| 0 | 0 | 0 | 0 |
| 0 | 0 | 1 | 0 |
| 0 | 1 | 0 | 1 |
| 0 | 1 | 1 | 0 |
| 1 | 0 | 0 | 1 |
| 1 | 0 | 1 | 0 |
| 1 | 1 | 0 | 1 |
| 1 | 1 | 1 | 0 |

The control module 26 also includes a timer 174 which comprises a diode $D_{12}$, a capacitor $C_5$, resistors $R_{21}$, $R_{22}$, $R_{23}$ and $R_{24}$, a Zener diode $ZD_4$, an operational amplifier $OP_5$ and an amplifier $A_4$. Since the diode $D_{12}$ is connected through a line 176 to the collector of the transistor $TR_3$, the output of the timer 174 is set to a high voltage level when the actuator valve 172 is energized. However, due to its inherent configuration, the timer's output remains at a high level for a predetermined period of time even if the actuator valve 172 is subsequently de-energized. It should be noted, in this connection, that the timer 174 is so adjusted that the output thereof is maintained at the high level for the predetermined length of time even during the intermittently changing, skid preventive ON-OFF cycle of the control module 26.

The output of the timer 174 is fed into a driver 178 which actuates the solenoid valve 88 or 100 for moving the extra wheel 62 into contact with the road surface 78. The driver 178 includes a transistor $TR_4$ having its base connected to the timer's output terminal through a resistor $R_{26}$ and its emitter grounded. The collector of the transistor $TR_4$ is connected to one end of the solenoid 89 (see FIG. 3), the other end of which is connected to a switch 180 operatively connected with the brake pedal 22. The switch 180 is connected at one end to the +B voltage supply and at the other to a brake lamp 182. As will be understood, the solenoid 89 is actuated if the transistor $TR_4$ is rendered conductive during depression of the brake pedal 22. If the driver releases the foot pedal 22 or at the predetermined period of time after the actuator valve 172 is de-activated by the timer 174, the solenoid valve 88 or 100 is de-activated so that the extra wheel 62 is moved away from the road surface 78. The condition in which the extra wheel 62 is moved to contact the road surface 78 will be hereinafter represented by the expression $L_5 = 1$.

The operation of the present skid control system will be described below with reference to FIGS. 9 and 10. FIG. 9 shows the manner in which the skid control system operates during braking on a high- $\mu$ (frictional coefficient) road such as a dry road made of concrete, whereas FIG. 10 shows the manner of its operation on a low- $\mu$ road such as a snow-covered or frozen road. In FIGS. 9 and 10, V represents the true vehicle speed which decreases as a result of braking. $V_v'$ represents the pseudo-vehicle speed corresponding to the output of the pseudo-vehicle speed signal circuit; $V_v$ represents the extra wheel speed corresponding to the output of the extra wheel speed sensor; and $V_v''$ represents the greater of $V_v'$ and $V_v$, $V_v$ being greater than the $V_v'$ after a point A has been reached. $V_v''$ appears at the output of the comparator 156. Further, $V_m$ is obtained at the output of the module speed signal circuit. $V_h + K_1V_h'$ is the sum of the outputs of the wheel speed sensor and the differentiating circuit 160, which are applied to the two inputs of the speed comparator. The levels $R_{12}/R_{13}V_c$ and $-R_{10}/R_{11}V_c$ which are represented by two broken horizontal lines are those at which discrimination is made by the acceleration comparator and the deceleration comparator, respectively, as expressed above in Eq. (7), (8), (9) and (10).

Shown in the lower part of FIGS. 9 and 10 are tables representing the levels of $L_1, L_2, L_3, L_4$ and $L_5$, in which the hatched portion indicate that the associated outputs are in a "1" state. As described above, whenever $L_4 = 1$, the actuator valves are activated to reduce the fluid pressure supplied to the associated brake cylinders to thereby keep the slipping rate in the neighborhood of 20 per cent.

It should be noted, in this connection, that the differentiating circuit, the deceleration comparator and the acceleration comparator are provided for the pospose of adjusting the slipping rate to 15 to 20 per cent as much as possible, although they can be dispensed with at the sacrifice of the skid preventive performance. Provision of the differentiating circuit and the two comparators results in a sharp decrease in the range of variation of the slipping rate. More particularly, in a case where the brakes are applied during running on a low $\mu$ road, the wheel speed decreases rapidly as indicated by a curve B in FIG. 10, because of the small coefficient of friction between the tires and the road surface. Assuming that there is no deceleration comparator incorporated, the actuator valves would be activated at a point D where the wheel speed intersects the curve $V_m$. And, due to the inherent time-lag in operation, the wheel speed would change as indicated by a curve E.

However, the deceleration comparator operates in such a manner that the actuator valves are activated at a point C where the deceleration rate exceeds the discrimination level $-R_{10}/R_{11}V_c$. Thus, the wheel speed begins to be accelerated at a point far earlier than E, thus reducing the range of variation of the slipping rate.

On the other hand, if the brakes are applied during running on a high $\mu$ road, the wheel speed decreases slowly due to the large coefficient of friction between the tires and the road, whereas when the fluid pressure being supplied to the brake cylinders is reduced, the wheel speed increases rapidly. Assuming that no acceleration comparator is provided, the actuator valves are de-activated at a point C in FIG. 9, causing the wheel speed to increase as indicated by a broken line B due to the time-lag in operation. This would increase the wheel speed close to the vehicle speed, thus raising a problem in that braking is ineffective when the wheel speed approaches the vehicle speed.

The acceleration comparator operates to de-activate the actuator valve at a point D where the acceleration rate exceeds the discrimination level $R_{12}/R_{13}V_c$, so as to prevent an excessive increase in wheel speed so that the range of variation of the slipping rate is considerably reduced.

Further, it should be noted that the speed comparator compares the module vehicle speed $V_m$ with the wheel speed $V_h$ plus $K_1V_h'$. The reason for this adding of $V_h$ and $K_1V_h'$ is that the $K_1V_h'$ signal functions to advance the ON timing of the actuator valve during high deceleration and also to advance the OFF timing of the actuator valve during high acceleration.

Further, it should be noted that in place of the extra wheel speed sensor, a vehicle speed sensor comprising a Doppler radar may be employed in the present system. In this case, the Doppler radar may conveniently be connected to a power source so as to transmit electromagnetic radiation only when the output of the timer is at a high level. While the Doppler radar may be actuated at all times or during depression of a brake pedal, it should be understood that it would be less injurious to the health of pedestrians or drivers exposed to the electromagnetic radiation to suppress the unnecessary electromagnetic radiation, especially in the urban area where a great number of motor vehicles run. Further, by so doing, it is possible to decrease the likelihood of malfunctioning of the present skid control system which would otherwise occur due to mutual interference among many electronic devices mounted on motor vehicles.

What is claimed is:

1. A skid control system for a motor vehicle, which comprises:
   a wheel speed sensor for generating a wheel speed signal;
   a pseudo vehicle speed signal generator for generating a pseudo-vehicle speed signal in accordance with the wheel speed signal;
   an actual vehicle speed sensor for generating an actual vehicle speed signal when energized;
   first means connected to said pseudo vehicle speed signal generator and actual vehicle speed sensor for passing therethrough the larger in amplitude of said pseudo vehicle speed signal and actual vehicle speed signal;
   a differentiator for differentiating said wheel speed signal to produce a wheel acceleration signal;
   second means connected to said first means, said wheel speed sensor and said differentiator for producing an impending skid signal in accordance with said the larger from said first means, of said wheel speed signal and the wheel acceleration signal;
   a second comparator connected to said differentiator for producing a brake release signal when said wheel acceleration signal lowers below a first predetermined level;
   a third comparator connected to said differentiator for producing a brake application signal when said wheel acceleration signal exceeds a second predetermined level;
   an actuation signal generator for producing an actuation signal in accordance with said impending skid signal, brake release signal and brake application signal;
   a brake pressure modulator for modulating the brake pressure in response to said actuation signal; and
   energizing means for energizing said actual vehicle speed sensor in response to said actuation signal or said impending skid signal.

2. A skid control system according to claim 1, in which said second means includes:
   a level adjustor for adjusting the amplitude of said the larger signal from said first means; and
   a first comparator for producing said impending skid signal in response to the level-adjusted signal from said level adjuster and said wheel speed and wheel acceleration signal.

3. A skid control system according to claim 2, in which said first comparator includes:
   a first operational amplifier;
   a first input resistor connecting the output terminal of said level adjuster with the input terminal of said first operational amplifier;

a second input resistor connecting the output terminal of said wheel speed sensor to the input terminal of said first operational amplifier;
a third input resistor connecting the output terminal of said differentiator with the input terminal of said first operational amplifier;
a first feed-back resistor bypassing said operational amplifier; and
a first zener diode having the anode thereof connected to the input terminal of said first operational amplifier and the cathode thereof connected to the output terminal of said first operational amplifier.

4. A skid control system according to claim 1, in which said second comparator includes:
a second operational amplifier;
a fourth input resistor connecting the output terminal of said differentiator with the input terminal of said second operational amplifier;
a fifth input resistor connecting a constant positive voltage source to the input terminal of said second operational amplifier;
a second feed-back resistor bypassing said second operational amplifier;
a second zener diode having the anode thereof connected to the input terminal of said second operational amplifier and the cathode thereof connected to the output terminal of said second operational amplifier.

5. A skid control system according to claim 1, in which said third comparator includes:
a third operational amplifier;
a sixth input resistor connecting the output terminal of said differentiator with the input terminal of said third operational amplifier;
a seventh input resistor connecting a constant negative voltage source with the input terminal of said third operational amplifier; and
a third zener diode having the cathode thereof connected to the input terminal of said third operational amplifier and the anode thereof connected to the output terminal of said third operational amplifier.

6. A skid control system according to claim 1, in which said actuation signal generator includes:
OR gate means for receiving said impending skid signal; and
AND gate means for receiving said brake application signal and the output signal of said OR gate means.

7. A skid control system according to claim 1, in which said energizing means includes:
integrating means for integrating said actuation signal; and
driving means for energizing said actual vehicle speed sensor in response to the integrated actuation signal.

8. A skid control system as claimed in claim 1, in which said vehicle speed sensor comprises an extra wheel, means for rotatably supporting the extra wheel, means for sensing the rotational velocity of the extra wheel, and producing the actual vehicle speed and means for moving the supporting means to a position to keep the extra wheel in engagement with the road surface, when it is actuated.

* * * * *